United States Patent [19]
Malvern

[11] Patent Number: 5,137,356
[45] Date of Patent: Aug. 11, 1992

[54] FIBER OPTIC RESONATOR INTERFEROMETER GYROSCOPE HAVING A RESONATOR LOOP FORMED OF TWO COUPLED LENGTHS OF OPTICAL FIBER

[75] Inventor: Alan R. Malvern, Plymouth, United Kingdom

[73] Assignee: British Aerospace Public Limited Company, London, England

[21] Appl. No.: 510,214

[22] Filed: Apr. 18, 1990

[30] Foreign Application Priority Data

Apr. 19, 1989 [GB] United Kingdom ............... 8908782
Aug. 14, 1989 [GB] United Kingdom ............... 8918502

[51] Int. Cl.$^5$ ............................................ G01C 19/72
[52] U.S. Cl. ..................................... 356/350; 372/94
[58] Field of Search .......................... 356/350; 372/94

[56] References Cited

U.S. PATENT DOCUMENTS 4,533,249 8/1985 Webber ................................ 356/350
4,674,881 6/1987 Lawrence et al. ................... 356/350

FOREIGN PATENT DOCUMENTS 0248648 12/1987 European Pat. Off. ............ 356/350
0040810 2/1988 Japan .................................. 356/350

OTHER PUBLICATIONS

"Passive Fiber-Optic Ring Resonator For Rotation Sensing", Meyer et al., Optics Letters, Dec. 1983, pp. 644–646.

Primary Examiner—Samuel A. Turner
Attorney, Agent, or Firm—Cushman, Darby & Cushman

[57] ABSTRACT

A fiber resonator gyro in which the resonator loop includes a first length of fiber having opposed ends into which respective clockwise and counterclockwise beams are launched. A second length of fiber is connected by two coupler means to spaced portions of said first length to form the loop. The couplers are preferably four-way couplers which have ports for dumping resonant radiation.

6 Claims, 4 Drawing Sheets

FIBRE RESONATOR COIL STRUCTURE, WITH FIBRE WRAPPED AROUND PZT TO FORM A SENSING COIL

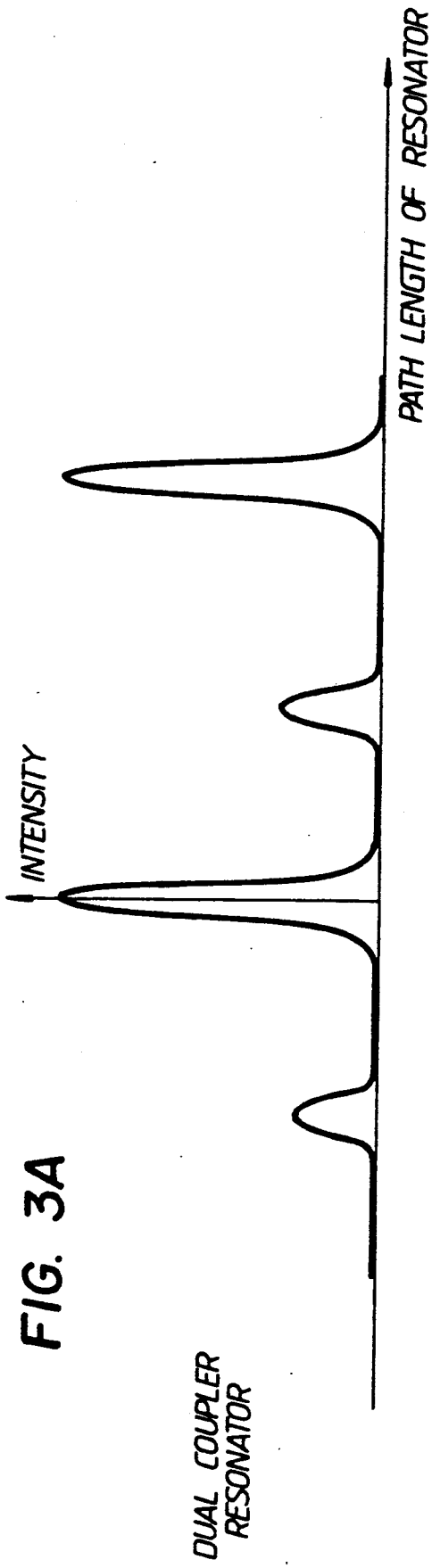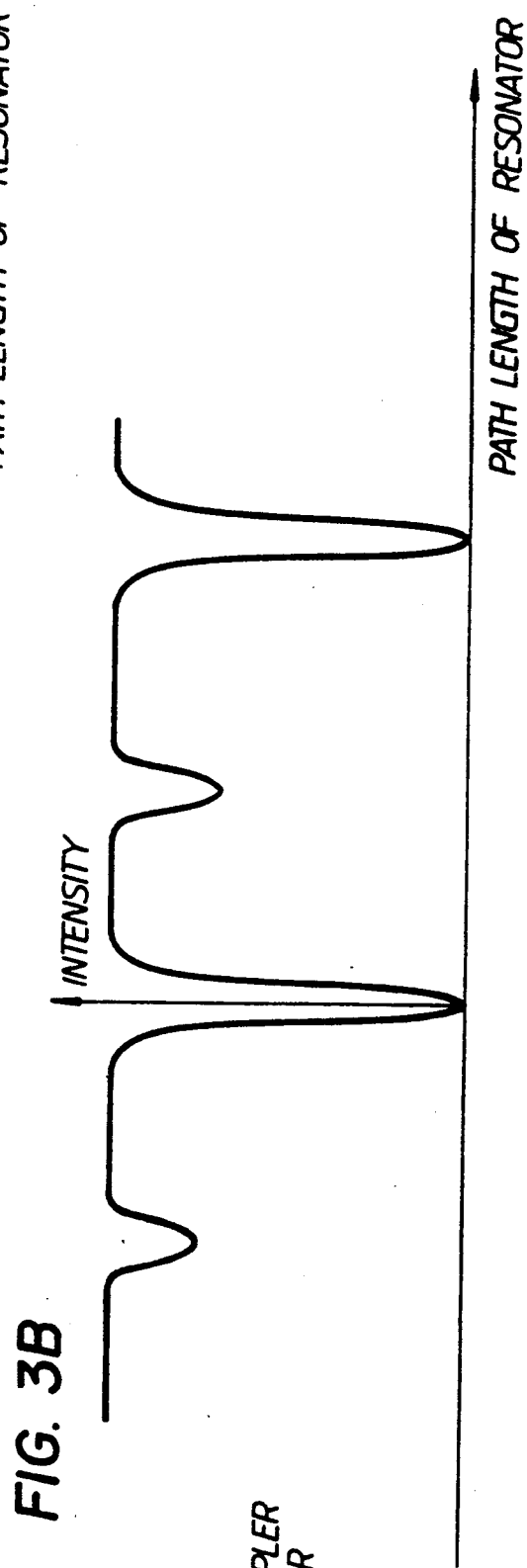
FIG. 3A DUAL COUPLER RESONATOR
FIG. 3B SINGLE COUPLER RESONATOR

FIBER OPTIC RESONATOR INTERFEROMETER GYROSCOPE HAVING A RESONATOR LOOP FORMED OF TWO COUPLED LENGTHS OF OPTICAL FIBER

This invention relates to a fibre optic resonator interferometer gyroscope.

Such devices, otherwise known as a fibre resonator gyros, comprise a fibre or fibres defining a resonator loop through which clockwise (CW) and counterclockwise (CCW) beams are passed. Both CW and CC; directions are maintained at resonance by a suitable control and the difference in frequency between the resonances is a measure of the rate of rotation applied to the gyro.

One of the major difficulties which arises in such gyros is that of establishing reciprocity, i.e. to ensure that, in the absence of rotation, both CW and CCW directions have exactly the same optical path length. Non-reciprocity creates a gyro bias, which will be an error signal. It is well known that optical fibre is birefringent and it is necessary to polarise the light passing through the input/output common port with a polarisation plane aligned accurately with one axis, e.g. the "fast" axis of the fibre, so that only one polarisation mode is excited. In practise it is only possible to align the polarization plane with the fast axis to within about 0.5 degrees so there is some residual coupling to the other polarisation mode. This means that, when the fast path is at resonance it is likely that the beam will also contain non-resonant frequencies and this can impair the accuracy of measurement and also contribute to non-reciprocity.

The cross-coupling and consequent non-resonant content in the CW and CCW beams leaving the resonator can cause problems both in conventional gyroscopes using CW and CCW detectors, and in gyroscopes where the CW and CCW beams are made to interfere on a single detector. The latter system is disclosed in our co-pending British patent applications Nos. 8908910.6 and 8918501.1 which form the priority bases for copending U.S. application Ser. No. 07/510,215 and particular problems may arise as the non-resonant frequencies may corrupt the interference data. A need exists therefore for a fibre resonator gyro in which non-resonant frequencies are reduced or suppressed in the CW and CCW beams leaving the resonator.

According to one aspect of this invention, there is provided a fibre resonator gyro in which the resonator loop includes a first length of fibre having opposed ends into which respective CW and CCW beams are injected in use, and a second length of fibre connected by coupler means to spaced portions of said first length.

An embodiment of the invention will now be described by way of example only, reference being made to the accompanying drawings, in which:

FIGS. 3(a) and 3(b) are graphs illustrating the transmitted light characteristics for the arrangements of FIGS. 1 and 2 respectively.

Figure 1:
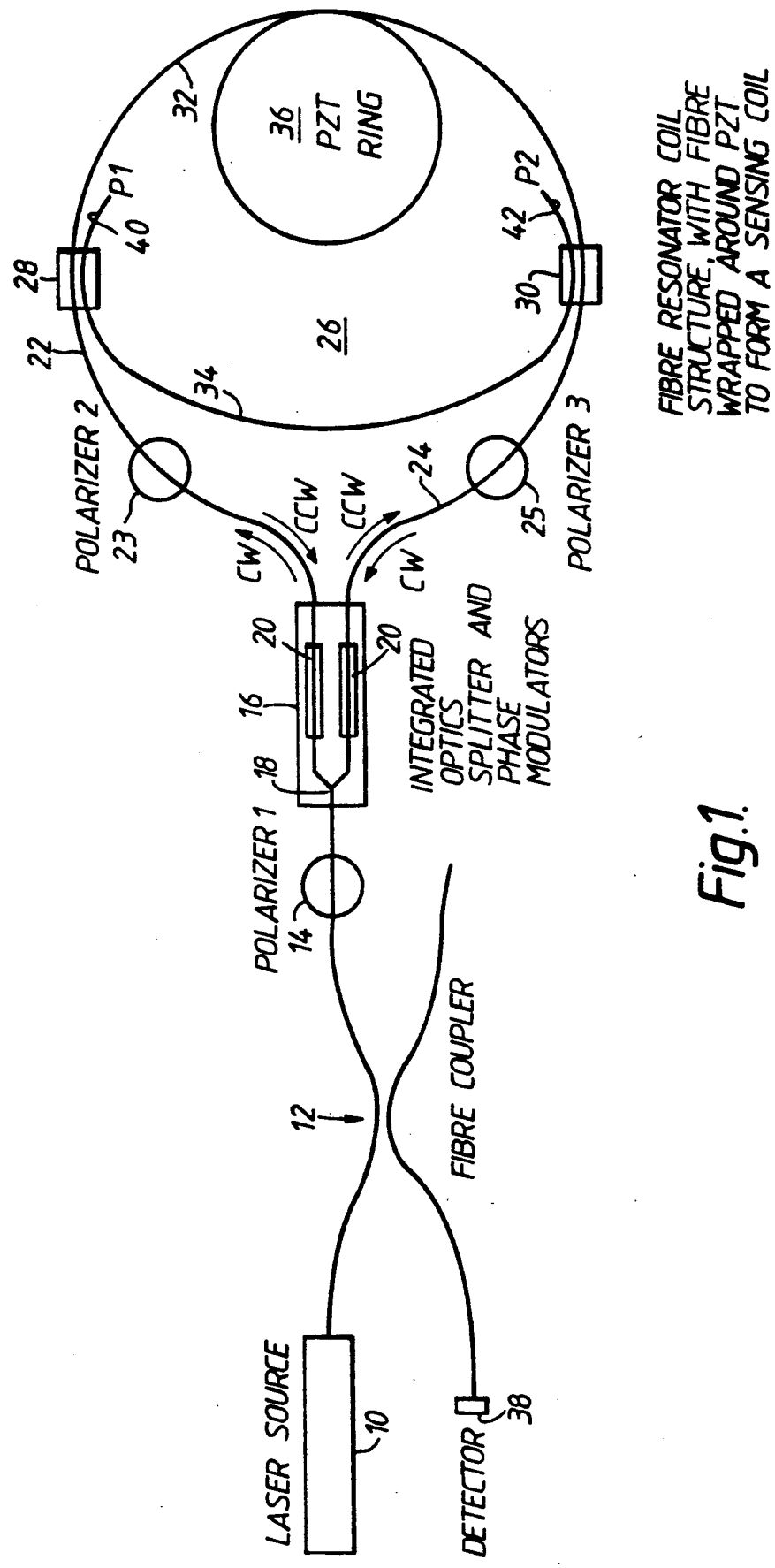
FIG. 1 is a schematic diagram of an example of fibre resonator interferometer gyro in accordance with the invention.

In the arrangement illustrated in FIG. 1, a narrow linewidth laser source 10, for example a YAG crystal pumped by a semiconductor laser, emits radiation typically at 1.3 $\mu$m wavelength and may include an isolator to prevent retroreflection affecting the laser. The light from the source 10 passes to an input coupler 12 with two input ports and two output ports. The light from one output port passes to a fibre polariser 14 which transmits the light to an integrated optics chip 16. Within the chip the light is split at 18 into CW and CCW beams. Phase modulators 20 apply respective antiphase modulations to the CW and CCW beams. After leaving the chip 16, the CW and CCW beams are conducted by two fibres 22,24 to the two ends of the resonator coil or loop 26. Each fibre 22,24 may have a polariser 23,25; alternatively, the polarisers may be incorporated on the integrated optics chip 16. In this example, the resonator coil comprises two four port couplers 28,30 which couple a first length of fibre 32 to a second length of fibre 34 to make up a closed loop. The couplers 28,30 have the property that a signal applied to an input port is transmitted without phase change to the aligned output port and reflected with a 90° phase change to the other, diagonally opposed, output port. The couplers 28,30 typically have a reflectivity of about 96% to 98%. The total length of the fibre resonator (defined by the first and second lengths of fibre 32,34 and the couplers 28,30) may typically be 10 meters, giving a mode spacing of 20 MHz. The high reflectivity of the couplers 28 and 30 means that there is a high transfer of light from one coupler to the other. The lengths of fibre 32,34 making up the fibre resonator are wound on a piezo-electric transducer 36.

The CW and CCW beams leaving the fibre resonator pass back to the integrated optics chip 16 where they are phase modulated and recombined. After leaving the chip a part of the recombined beam is made incident on a detector 38 via the input coupler 12.

Figure 2:
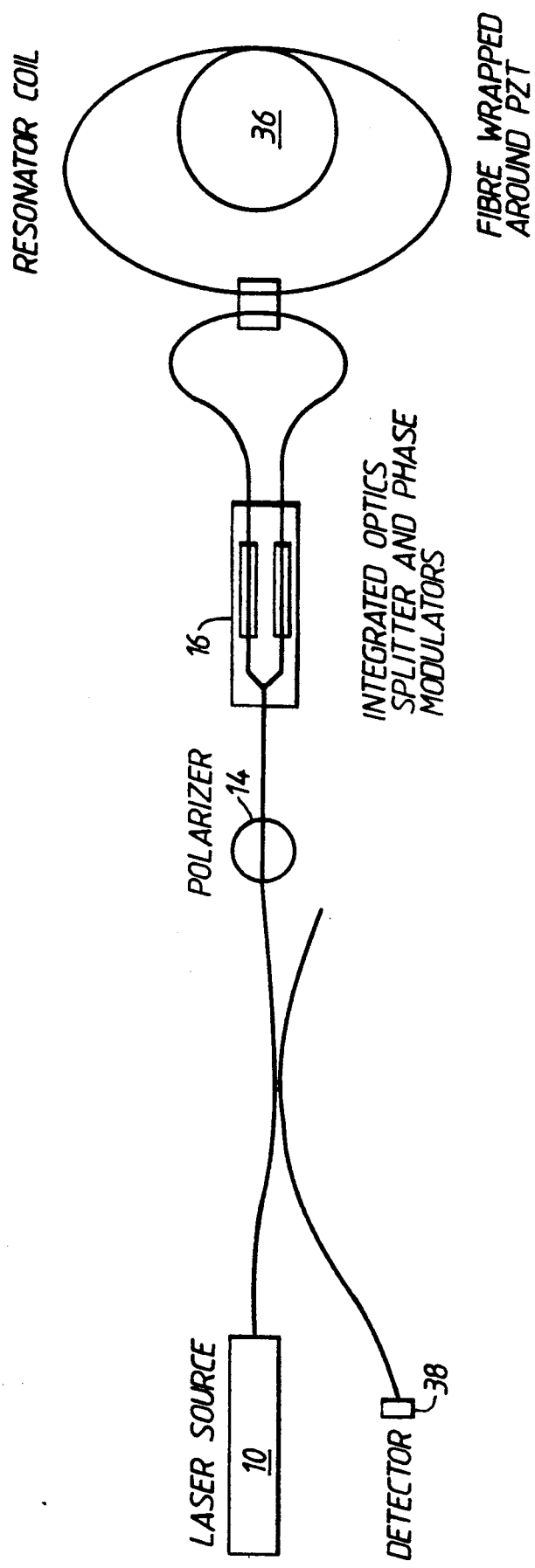
FIG. 2 is a schematic diagram of an earlier proposal for a fibre resonator interferometer gyro of the type described and illustrated in our co-pending British applications Nos. 8918501.1, and 8908910.6. (Our Reference 24-6361) to which reference is directed.
Figure 4:
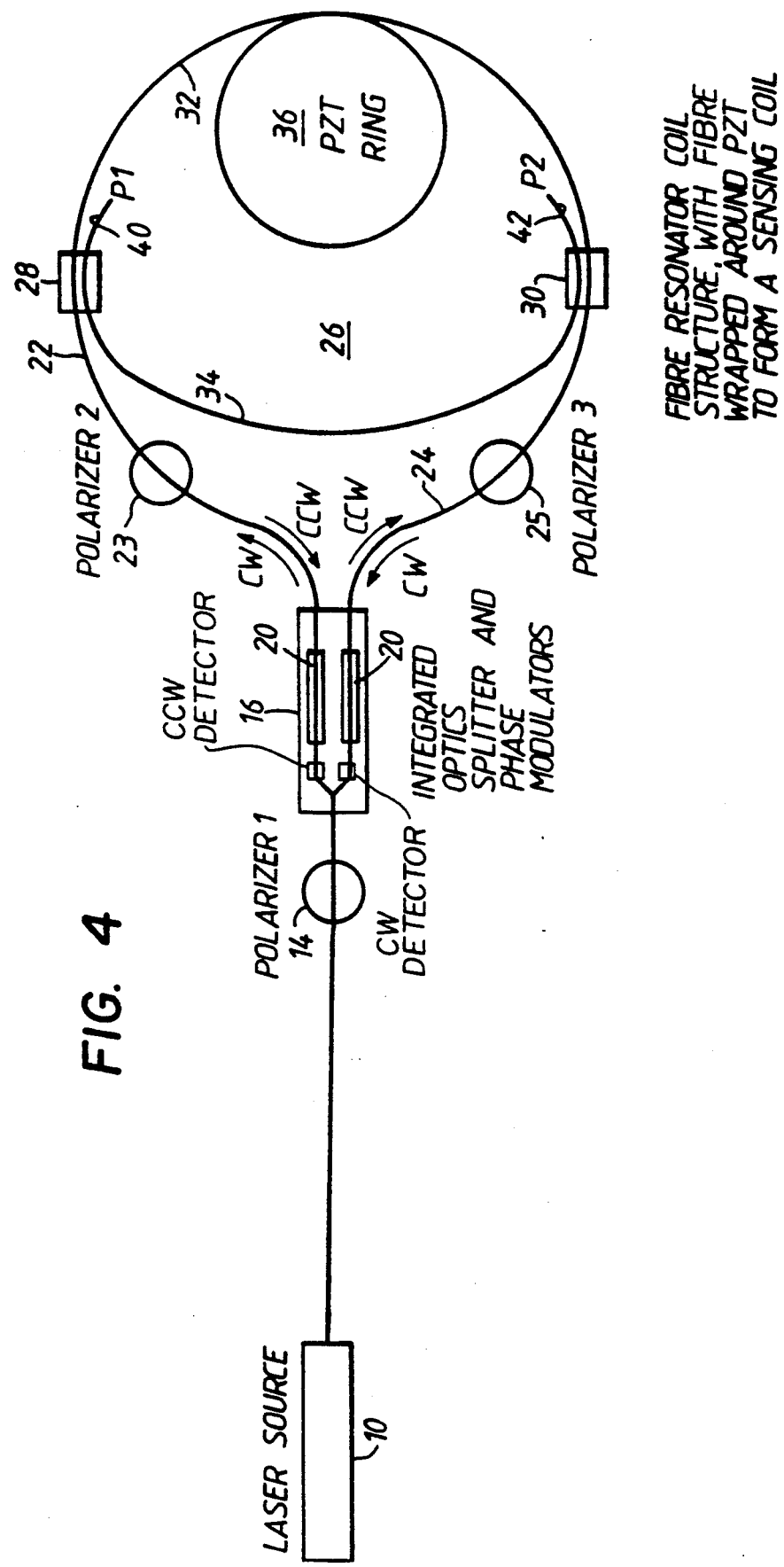
FIG. 4 is a schematic diagram of another example of a fiber resonator gyro in accordance with the invention which includes separate detectors for detecting counterclockwise and clockwise beams.

The output of the detector 38, suitably processed, provides the error signals in a first path length control loop which applies compensatory reciprocal path length changes via the piezo-electric transducer 36 and in a second frequency control loop which applies non-reciprocal phase shifts via the phase modulators 20. The amount of non-reciprocal phase shift necessary to maintain both CW and CCW directions at resonance is related to the rate of rotation experienced by the resonator about its axis. Our co-pending Applications contain a description of an example of a suitable form of control system for controlling the phase modulators 20 and the piezo-electric transducer 36 on the basis of the output from the detector 38 and for providing a signal indicative of the applied rotation. FIG. 2 is a schematic view of a proposal for a fibre resonator gyro of the type disclosed in our co-pending application.

There is a major distinction between the arrangements illustrated in FIGS. 1 and 2. In FIG. 1, the resonator loop of the present invention uses two couplers, whereas in the arrangement illustrated in FIG. 2, the resonator loop has a single coupler. Analysis of the optical paths and phase changes shows that, in the arrangement of FIG. 1, the light incoming on one fibre forms a positive resonance on the output fibre. Thus on resonance there is a maximum of intensity of light transmitted along the output fibre with very little light transmitted off resonance. This contrasts with the arrangement of FIG. 2 in which the transmitted intensity shows a minimum intensity on resonance and a maximum of power transmitted off resonance. In the arrangement of FIG. 1, the off resonant light is rejected by the two ports 40,42. In FIG. 2 there is nowhere that the off resonant light can be dumped so it passes to the detector where it contributes to the signal and there is a danger that it may corrupt the interference data.

FIG. 3(a) illustrates the characteristics of the transmitted light for the arrangement of FIG. 1 and the curve shows that there are positive resonance peaks for the "fast" and "slow" polarisation modes with the slow (orthogonal) polarisation being approximately midway between the main polarisation resonances. The presence of the orthogonal polarisation mode is due to the imperfect angular alignment of the coupler blocks that make up the resonator. As mentioned above, with perfect alignment of the coupler and the input polarisation state, a single polarisation mode would be obtained, but in practise coupling accuracy is no better than ± 0.5 degrees so there is some residual coupling.

FIG. 3(b) illustrates the characteristics for the FIG. 2 arrangement. Here, the resonances occur as dips in the transmission curve.

In the example of FIG. 1, when the CW and CCW beams are brought together by the integrated optics chip 16, only the desired light is interfered together by virtue of the positive resonances. The light of the other polarization is rejected by virtue of being non-resonant and is dumped through ports 40 and 42. The light that reaches the detector is thus substantially unaffected by the unwanted polarization, which is not the case for the earlier proposal shown in FIG. 2.

If the polarizer in FIG. 1 is perfect, then the gyro is perfectly reciprocal. In the arrangement of FIG. 1, each of the laser beams suffers one reflection and one transmission of the coupler within the integrated optics chip 16 so there is no net phase shift due to this source. The polarizers 23 and 25 can be integral with the resonator without splices to ensure the angular alignment is not lost or, as mentioned earlier, they may form part of the integrated optics chip.

Mathematical analysis of the various transfer functions around the resonator loop show that the form of resonator loop shown in FIG. 1 acts as a form of polariser which enhances the required polarisation with respect to the unwanted polarisation caused by misalignment of the fibre polariser 14. This enhancement is proportional to the finesse of the resonator and only occurs when the unwanted polarisation is non-resonant.

I claim:

1. A fiber resonator gyroscope comprising:
   a first length of optical fiber;
   a second length of optical fiber, coupled to said first length of optical fiber, to define a complete resonator loop through which radiation may propagate in both clockwise and counterclockwise directions;
   two optical four-port couplers, wherein said first length and said second length are coupled by said two optical couplers at their respective ends, and each said coupler is connected between a respective end of said first length of fiber and a respective end of said second length of fiber, and wherein the respective ends of the first and second lengths of fiber are connected to two diagonally opposed ports of each said four-port coupler, wherein one of the remaining ports of each four-port coupler is connected to a respective further length of fiber for passing radiation to and from said resonator loop;
   means for introducing into said resonator loop clockwise and counterclockwise beams; and
   detector means responsive to intensities of said clockwise and counterclockwise beams after propagation around said resonator loop.

2. A fiber resonator gyro according to claim 1, wherein said detector means is a detector on which said clockwise and counterclockwise beams interfere, after leaving said resonator loop.

3. A fiber resonator gyro according to claim 1, wherein said detector means includes respective clockwise and counterclockwise detectors on which clockwise and counterclockwise beams are made incident.

4. A fiber resonator gyroscope according to claim 1, wherein the other remaining port of each four-port coupler is arranged to receive and dump off resonant radiation.

5. A fiber resonator gyroscope comprising:
   a resonator loop formed of two lengths of optical waveguide coupled end to end by four-port optical couplers, ends of waveguide being coupled to diagonally opposed ports of the couplers, and
   means for launching respective clockwise and counterclockwise beams into respective ones of the remaining ports of the two couplers which form input/output ports, whereby non-resonant frequencies in the loop pass to the ports diagonally opposed to said input/output ports.

6. A resonator gyroscope, comprising:
   a resonator loop formed of first and second lengths of optical waveguide;
   two spaced regions of said first length being optically coupled to a respective two spaced regions of said second length to form two spaced optically coupled regions;
   each optically coupled region defining a four-port optical coupling region wherein at least a component of light arriving at a given port is coupled to the diagonally opposed port, and
   means for launching respective clockwise and counterclockwise beams into opposed ends of said first length of optical waveguide,
   whereby non-resonant frequencies in the loop exit the loop via said optically coupled regions and pass towards the opposed ends of said second length of optical waveguide.

* * * * *